US010686176B2

(12) United States Patent
Wegner et al.

(10) Patent No.: US 10,686,176 B2
(45) Date of Patent: Jun. 16, 2020

(54) SEPARATOR HAVING A POLYSULFIDE BARRIER LAYER FOR LITHIUM-SULFUR CELLS

(71) Applicant: Robert Bosch GmbH, Stuttgart (DE)

(72) Inventors: Marcus Wegner, Leonberg (DE); Jean Fanous, Stuttgart (DE); Jens Grimminger, Leonberg (DE); Martin Tenzer, Nuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 1563 days.

(21) Appl. No.: 14/364,402

(22) PCT Filed: Nov. 15, 2012

(86) PCT No.: PCT/EP2012/072744
§ 371 (c)(1),
(2) Date: Jun. 11, 2014

(87) PCT Pub. No.: WO2013/087348
PCT Pub. Date: Jun. 20, 2013

(65) Prior Publication Data
US 2014/0342214 A1 Nov. 20, 2014

(30) Foreign Application Priority Data
Dec. 16, 2011 (DE) .................. 10 2011 088 910

(51) Int. Cl.
*H01M 2/16* (2006.01)
*H01M 4/38* (2006.01)
(Continued)

(52) U.S. Cl.
CPC ....... *H01M 2/1686* (2013.01); *H01M 2/1646* (2013.01); *H01M 2/1653* (2013.01);
(Continued)

(58) Field of Classification Search
CPC ............ H01M 2/1686; H01M 2/1646; H01M 2/1653; H01M 4/38; H01M 4/581; H01M 4/5815; H01M 10/052; H01M 10/4235
(Continued)

(56) References Cited

U.S. PATENT DOCUMENTS

| 3,351,495 A | 11/1967 | Larsen et al. |
| 6,403,251 B1 | 6/2002 | Baggaley et al. |

(Continued)

FOREIGN PATENT DOCUMENTS

| CN | 1334969 A | 2/2002 |
| CN | 1494173 A | 5/2004 |

(Continued)

OTHER PUBLICATIONS

A. Bhattacharya, B.N. Misra, "Grafting: a versatile means to modify polymers: Techniques, factors and applications", Prog. Polym. Sci. 29, pp. 767-814, Aug. 2004. (Year: 2004).*

(Continued)

*Primary Examiner* — Jonathan G Jelsma
(74) *Attorney, Agent, or Firm* — Maginot, Moore & Beck LLP

(57) ABSTRACT

A lithium-sulfur cell includes a lithium-containing anode, a sulfur-containing cathode and a separator arranged between the lithium-containing anode and the sulfur-containing cathode. To suppress a shuttle mechanism and to prevent a loss of active material, the separator includes a base layer and a polysulfide barrier layer. The polysulfide barrier layer is formed on the cathode side of the separator.

3 Claims, 1 Drawing Sheet

(51) Int. Cl.
*H01M 10/052* (2010.01)
*H01M 4/58* (2010.01)
*H01M 10/42* (2006.01)

(52) U.S. Cl.
CPC .............. *H01M 4/38* (2013.01); *H01M 4/581* (2013.01); *H01M 4/5815* (2013.01); *H01M 10/052* (2013.01); *H01M 10/4235* (2013.01); *H01M 2220/20* (2013.01); *H01M 2220/30* (2013.01); *Y02E 60/122* (2013.01); *Y02T 10/7011* (2013.01)

(58) Field of Classification Search
USPC ........................................................ 429/144
See application file for complete search history.

(56) References Cited

U.S. PATENT DOCUMENTS

| | | | |
|---|---|---|---|
| 7,070,632 | B1 | 7/2006 | Visco et al. |
| 9,252,455 | B1* | 2/2016 | Liu .................... H01M 10/0562 |
| 2001/0000485 | A1 | 4/2001 | Ying et al. |
| 2004/0106037 | A1 | 6/2004 | Cho et al. |
| 2006/0177732 | A1 | 8/2006 | Visco et al. |
| 2009/0226809 | A1* | 9/2009 | Vu .......................... H01M 2/166 |
| | | | 429/220 |
| 2010/0129699 | A1* | 5/2010 | Mikhaylik .......... H01M 2/1653 |
| | | | 429/50 |
| 2010/0203383 | A1* | 8/2010 | Weppner .............. C01G 25/006 |
| | | | 429/209 |
| 2010/0273063 | A1* | 10/2010 | Wallace ................. H01G 9/022 |
| | | | 429/317 |
| 2011/0028657 | A1* | 2/2011 | Clark ......................... C08F 2/38 |
| | | | 525/333.7 |
| 2012/0021280 | A1* | 1/2012 | Katase ................... H01G 11/22 |
| | | | 429/211 |
| 2012/0315545 | A1* | 12/2012 | Son ...................... H01M 2/1673 |
| | | | 429/246 |
| 2013/0017432 | A1* | 1/2013 | Roumi ................ H01M 2/1686 |
| | | | 429/145 |
| 2016/0190549 | A1* | 6/2016 | Ohara ................... H01M 4/131 |
| | | | 429/163 |

FOREIGN PATENT DOCUMENTS

| | | |
|---|---|---|
| DE | 699 08 189 T2 | 3/2004 |
| JP | 2002-532852 A | 10/2002 |
| JP | 2004-158453 A | 6/2004 |
| JP | 2006-503416 A | 1/2006 |
| WO | 2005/085138 A1 | 9/2005 |
| WO | 2008/039419 A2 | 4/2008 |
| WO | 2010/111087 A1 | 9/2010 |
| WO | WO 2010117219 A2 * 10/2010 .......... H01M 4/0485 |
| WO | 2011/131584 A1 | 10/2011 |
| WO | 2013/013867 A1 | 1/2013 |

OTHER PUBLICATIONS

International Search Report corresponding to PCT Application No. PCT/EP2012/072744, dated Jul. 1, 2013 (German and English language document) (11 pages).

* cited by examiner

SEPARATOR HAVING A POLYSULFIDE BARRIER LAYER FOR LITHIUM-SULFUR CELLS

This application is a 35 U.S.C. § 371 National Stage Application of PCT/EP2012/072744, filed on Nov. 15, 2012, which claims the benefit of priority to Serial No. DE 10 2011 088 910.8, filed on Dec. 16, 2011 in Germany, the disclosures of which are incorporated herein by reference in their entirety.

The present disclosure relates to a separator, a lithium-sulfur cell, a lithium-sulfur battery and also a mobile or stationary system such as a vehicle or an energy storage system.

BACKGROUND

In order to produce batteries having a markedly higher energy density, currently, the lithium-sulfur battery technology is being researched, via which the energy content of currently 200 Wh/kg can theoretically be increased to above 1000 Wh/kg.

In order to achieve an energy content of above 1000 Wh/kg, however, the cathode would have to be formed completely of elemental sulfur. However, elemental sulfur is neither ionic nor electrically conducting, and so additives must be added to the cathode which markedly reduce the theoretical value.

A further problem is the solubility of the polysulfides $S_x^{2-}$ that are formed during discharge (reduction). These can migrate to the lithium anode and be reduced there, in such a manner that no electric current can be produced therefrom. This process is generally termed shuttle mechanism, and leads to a further decrease in the energy density.

SUMMARY

The present disclosure relates to a lithium-sulfur cell which comprises a lithium-containing anode, a sulfur-containing cathode and a separator arranged therebetween, i.e. between the lithium-containing anode and the sulfur-containing cathode.

The separator in this case comprises, in particular, a base layer and a polysulfide barrier layer. The polysulfide barrier layer can in this case be constructed, in particular, on the cathode side of the separator.

A polysulfide barrier layer can be taken to mean, in particular, a layer which prevents polysulfides, in particular having a chain length of greater than or equal to 3, for example from 3 to 8, from diffusing through the layer. The diffusion-barrier property can in this case be due to various principles. For example, polysulfides can be prevented from penetrating the polysulfide barrier layer by the polysulfides being able to form a reversible, for example ionic, bond to a material of the polysulfide barrier layer. However, it is likewise possible that the polysulfide barrier layer is lithium ion-conducting, and tight, or lithium-ion-conducting, or is non-lithium-ion-conducting, and has a porosity at least so low that polysulfides cannot pass through it.

The polysulfide barrier layer can advantageously prevent polysulfide from penetrating the separator and thereby from reaching the anode. The advantage which results therefrom is a suppression of the shuttle process. By suppressing the shuttle process, the loss of active material and losses of capacity and energy associated therewith can advantageously be prevented during charging of the cell. Since the polysulfides remain in the vicinity of the cathode, at which they can be further reduced or reoxidized, advantageously, in addition, a better sulfur utilization can be achieved and the energy efficiency can be increased during charging of the cell.

In the context of an embodiment, the base layer comprises at least one polyolefin, for example polyethylene and/or polypropylene. In particular, the base layer can be constructed from at least one polyolefin.

In the context of a further embodiment, the polysulfide barrier layer comprises at least one material having polysulfide affinity, in particular polymer. Optionally, the polysulfide barrier layer can be constructed from at least one material having polysulfide affinity, in particular polymer.

A material having polysulfide affinity, in particular a polymer, can be taken to mean, in particular, a material or polymer which can bind reversibly, for example ionically, polysulfides, in particular having a chain length of greater than or equal to 3, for example from 3 to 8. In particular, a material having polysulfide affinity, or polymer, can have a higher polysulfide affinity than the material of the base layer. The polysulfide affinity of the material or polymer can be determined, for example, by using the material under test as a separator in a double-chamber cell/osmosis cell, and concentration measurement in the two half cells.

Because the material having polysulfide affinity can bind polysulfides, the material having polysulfide affinity can prevent polysulfides from diffusing further into the separator and also through the separator to the anode. Preferably, the polysulfides, however, are not bound too strongly, in such a manner that they can participate later again in the cathode reaction.

In the context of a configuration of this embodiment, the polysulfide barrier layer comprises at least one polymer, in particular polyethylene glycol (PEG) or polypropylene glycol. Optionally, the polysulfide barrier layer can be constructed from at least one polyether, in particular polyethylene glycol or polypropylene glycol. Via polyethers, or a (surface) modification with polyethers, advantageously an increased polysulfide affinity of the polysulfide barrier layer can be achieved. If the base layer is constructed from at least one polyolefin, the separator, in the context of this embodiment, can also be termed as a surface-modified polyolefin separator.

In the context of another, alternative or additional configuration of this embodiment, the polysulfide barrier layer comprises at least one polyolefin-polyether copolymer. Optionally, the polysulfide barrier layer can be constructed from at least one polyolefin-polyether copolymer. Via a polyolefin-polyether copolymer, advantageously, in particular on a nanoscale, not only the advantages of the polyolefin as separator material, but also of the polyether as material having polysulfide affinity can be combined with one another.

In the context of a further, alternative or additional embodiment, the polysulfide barrier layer comprises at least one polysulfide-tight, in particular ceramic or polymeric, material. Optionally, the polysulfide barrier layer can be constructed from at least one polysulfide-tight, in particular ceramic and/or polymeric, material.

A polysulfide-tight material can be taken to mean a material which is lithium ion-conducting and is tight, or which is lithium ion-conducting or which is not lithium ion-conducting and has a porosity at least so low that polysulfides, in particular having a chain length of greater than or equal to 3, for example 3 to 8, cannot pass through the material. In particular a polysulfide-tight material can have a higher polysulfide tightness than the material of the base layer. The polysulfide tightness of a material can be determined, for example, by use of the material under test as a separator in a double-chamber cell/osmosis cell, and concentration measurement in the two half cells.

Via the polysulfide-tight material, polysulfides can likewise be prevented from diffusing further into the separator and also through the separator to the anode. The lithium ion-conducting property or the low porosity ensure in this case that lithium ions can pass through the material.

The at least one polysulfide-tight material can be, for example, a lithium ion-conducting, ceramic or polymeric material. For example, the at least one polysulfide-tight material can be selected from the group of the ceramic lithium ion conductors and the polymeric lithium ion conductors, in particular the ceramic lithium ion conductors having garnet structure. In addition, the at least one polysulfide-tight material can be material having a polysulfide affinity.

In the context of a further embodiment, the polysulfide barrier layer is bound to the base layer chemically and/or physically, in particular chemically.

In the context of a development of this embodiment, the at least one polymer having polysulfide affinity of the polysulfide barrier layer is grafted to polymer chains of the base layer, in particular of the at least one polyolefin. For example, a polyether, for example polyethylene glycol (PEG) can be grafted, in particular in situ, onto the base layer, in particular the polyolefin of the base layer. The reaction in this case can be initiated, for example, by UV activation. Thus, advantageously, a chemical binding of the polysulfide barrier layer to the surface of the base layer can be effected.

A physical binding of a polymer having polysulfide affinity to the surface of the base layer can proceed in a similar manner, and, for example, can likewise be initiated by a UV activation.

In the context of another development of this embodiment, the at least one polysulfide-tight material of the polysulfide barrier layer is applied to the base layer by crystallization or vapor deposition, for example, from solution, or thermally. Thus, advantageously, a physical binding of the polysulfide barrier layer to the base layer can be effected.

In the context of a further embodiment, the polysulfide barrier layer is constructed as a multilayer layer system. In this case, in particular, at least one layer can comprise at least one polymer having polysulfide affinity, in particular at least one polyether, for example polyethylene glycol and/or polypropylene glycol, and/or at least one polyolefin-polyether copolymer, or be constructed therefrom. At least one other layer in this case can comprise at least one polysulfide-tight material or be constructed therefrom. By construction of the polysulfide barrier layer in the form of a multilayer layer system, the individual layers can advantageously each carry out their function over the entire surface. Preferably, in this case, the polysulfide-tight layer is constructed on the layer having polysulfide affinity facing away from the cathode.

In the context of a further embodiment, the polysulfide barrier layer comprises a mixture (blend) of at least one polymer having polysulfide affinity, and at least one polysulfide-tight material. Optionally, the polysulfide barrier layer can be constructed therefrom. Via a mixture or blend, for example of polymeric and ceramic material, advantageously a particularly thin polysulfide barrier layer can be constructed.

In particular, the polysulfide barrier layer can comprise a mixture (blend) of at least one polyolefin-polyether copolymer and at least one polysulfide-tight, ceramic material, or be constructed therefrom. For this purpose, during the synthesis of the copolymer, particles of a polysulfide-tight material, for example ceramic particles, can be incorporated into the reaction product. Thus, advantageously, a particularly good polysulfide barrier action can be achieved and thin barrier layers can be effected.

With respect to further features and advantages of the lithium-sulfur cell according to the disclosure, reference is hereby made explicitly to the explanations in connection with the separator according to the disclosure which is explained later, the lithium-sulfur battery according to the disclosure which is explained later, the mobile or stationary system according to the disclosure which is explained later, and to the figures and the description of the figure.

The present disclosure further relates to a separator for a lithium-sulfur cell which comprises at least one polyolefin-polyether copolymer. In particular, the polyolefin-polyether copolymer can be a copolymer of at least one polyolefin, selected from the group consisting of polyethylene, polypropylene and combinations thereof, and/or at least one polyether, selected from the group consisting of polyethylene glycol, polypropylene glycol and combinations thereof. In particular, the separator can comprise at least one polyolefin-polyether copolymer. It is possible in this case that the separator additionally comprises a base layer. The polyolefin-polyether copolymer layer in this case can be constructed on the cathode side of the separator. Optionally, the separator, however, can also consist of a polyolefin-polyether copolymer layer.

With regard to further features and advantages of the separator according to the disclosure, reference is hereby explicitly made to the explanations in connection with the lithium-sulfur cell according to the disclosure, the lithium-sulfur battery according to the disclosure which is described later, the mobile or stationary system according to the disclosure which is described later, and also to the figures and description of the figures.

The present disclosure further relates to a lithium-sulfur battery which comprises at least two lithium-sulfur cells according to the disclosure and/or a separator according to the disclosure.

With regard to further features and advantages of the lithium-sulfur battery according to the disclosure, reference is hereby made explicitly to the explanations in connection with the lithium-sulfur cell according to the disclosure, the separator according to the disclosure, the mobile or stationary system according to the disclosure which is explained later, and also to the figures and the description of the figures.

The present disclosure further relates to a mobile or stationary system which comprises a lithium-sulfur cell according to the disclosure and/or a lithium-sulfur battery according to the disclosure and/or a separator according to the disclosure. In particular, this can be in this case a vehicle, for example a hybrid vehicle, plug in-hybrid vehicle or electric vehicle, a (high) energy storage system, for example for stationary energy storage, for example in a house or a technical system, an electrical tool, an electric garden apparatus or an electronic apparatus, for example a notebook, a PDA, or a mobile telephone.

Since lithium-sulfur cells have a very high energy density, lithium-sulfur cells according to the disclosure and lithium-sulfur batteries according to the disclosure are suitable to a particular extent for hybrid vehicles, plug in-hybrid vehicles and electric vehicles, and also in particular a stationary energy storage system.

With regard to further features and advantages of the mobile or stationary systems according to the disclosure, reference is hereby made explicitly to the explanations in connection with the lithium-sulfur cell according to the disclosure, the lithium-sulfur battery according to the disclosure, the separator according to the disclosure and also to the figures and description of the figures.

BRIEF DESCRIPTION OF THE DRAWINGS

Further advantages and advantageous developments of the subjects according to the disclosure are illustrated by the drawings and are explained in the description hereinafter. It must be noted in this case that the drawings only have a descriptive character and are not intended to restrict the disclosure in any manner. In the drawings

FIG. 1 shows a lithium-sulfur cell which comprises a lithium-containing anode 1, a sulfur-containing cathode 2 and a separator 3 which is arranged therebetween, i.e. between the lithium-containing anode 1 and the sulfur-containing cathode 2. In this case the separator 3 comprises a base layer 3a and a polysulfide barrier layer 3b which is constructed on the cathode side of the separator 3.

The polysulfide barrier layer 3b can advantageously prevent polysulfides from penetrating the separator 3 and therefore from reaching the anode 1, and thus suppress a shuttle mechanism which otherwise could lead to a loss of active material.

In order to ensure the barrier action, the polysulfide barrier layer 3b can comprise a polymer having polysulfide affinity, a polysulfide-tight, ceramic or polymeric material, or a mixture thereof.

Figure 1:
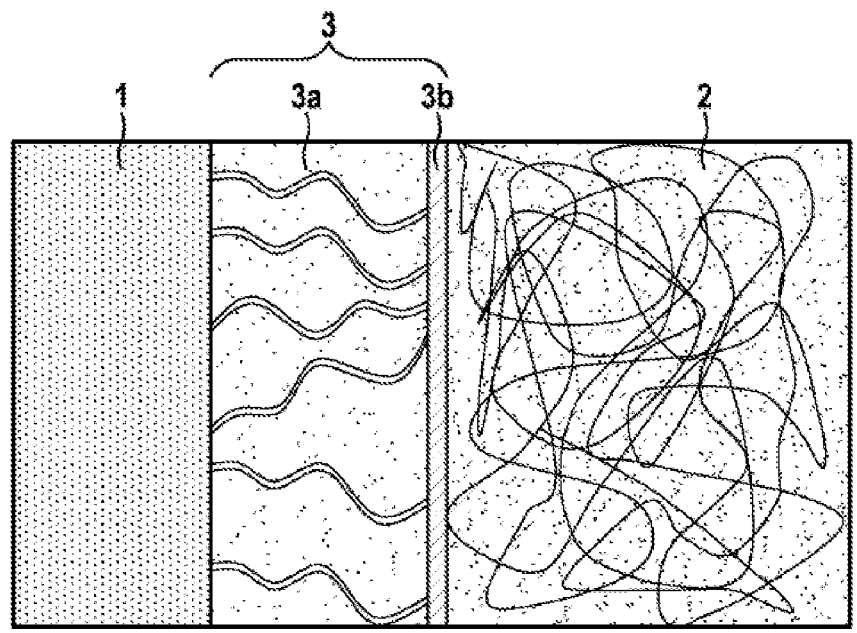
FIG. 1 shows a schematic cross section through an embodiment of a lithium-sulfur cell according to the disclosure.
Figure 2:
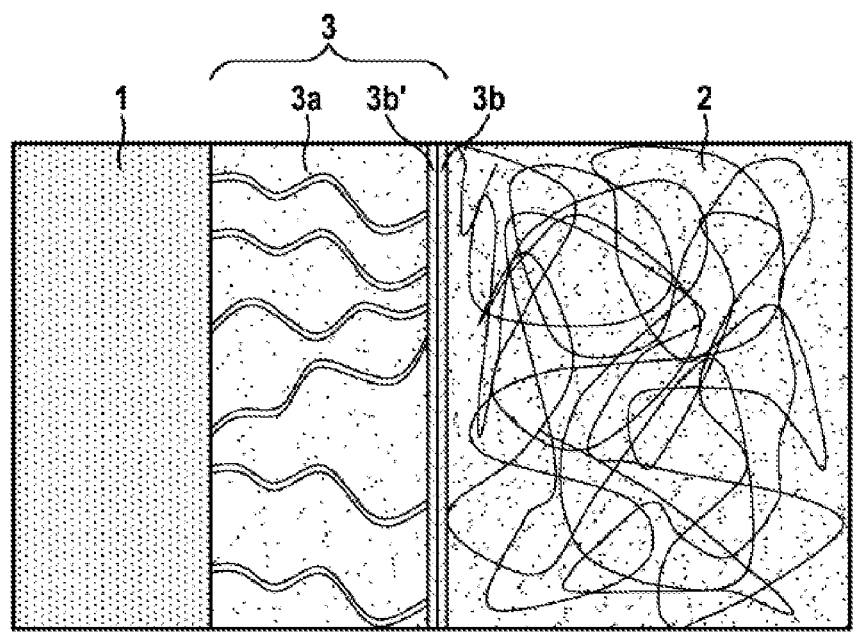
FIG. 2 shows a schematic cross section through a further embodiment of a lithium-sulfur cell according to the disclosure.

In the context of the embodiment shown in FIG. 2, the polysulfide barrier layer 3b is constructed as a multilayer, in particular double-layer, layer system 3b, 3b', in which one layer 3b comprises a polymer having polysulfide affinity and the other layer 3b' comprises a polysulfide-tight ceramic material, wherein the polysulfide-tight layer 3b' is constructed on the side of the layer 3b that has polysulfide affinity and which is facing away from the cathode 2.

The invention claimed is:

1. A lithium-sulfur cell, comprising:
   a lithium-containing anode;
   a sulfur-containing cathode; and
   a separator arranged between the lithium-containing anode and the sulfur-containing cathode, wherein the separator includes a base layer and a polysulfide barrier layer including at least one polymer having polysulfide affinity which forms a reversible ionic bond with a polysulfide and at least one polyolefin-polyether copolymer, the polysulfide barrier layer formed on a side of the separator facing the sulfur-containing cathode.

2. The lithium-sulfur cell of claim 1, wherein the polysulfide barrier layer includes a mixture of the at least one polymer having polysulfide affinity and at least one polysulfide-tight material.

3. A lithium-sulfur cell, comprising:
   a lithium-containing anode;
   a sulfur-containing cathode; and
   a separator arranged between the lithium-containing anode and the sulfur-containing cathode, the separator including a base layer and a polysulfide barrier layer, the polysulfide barrier layer formed on a side of the separator facing the sulfur-containing cathode from a mixture of at least one polymer having polysulfide affinity and at least one polysulfide-tight material, wherein
   the polysulfide barrier layer includes at least one polyolefin-polyether copolymer,
   the polysulfide barrier layer is formed on a side of the separator facing the sulfur-containing cathode, and
   during a synthesis of the mixture of at least one polymer having polysulfide affinity and at least one polysulfide-tight material, ceramic particles are inserted into a reaction product of the synthesis.

* * * * *